Figure 4:
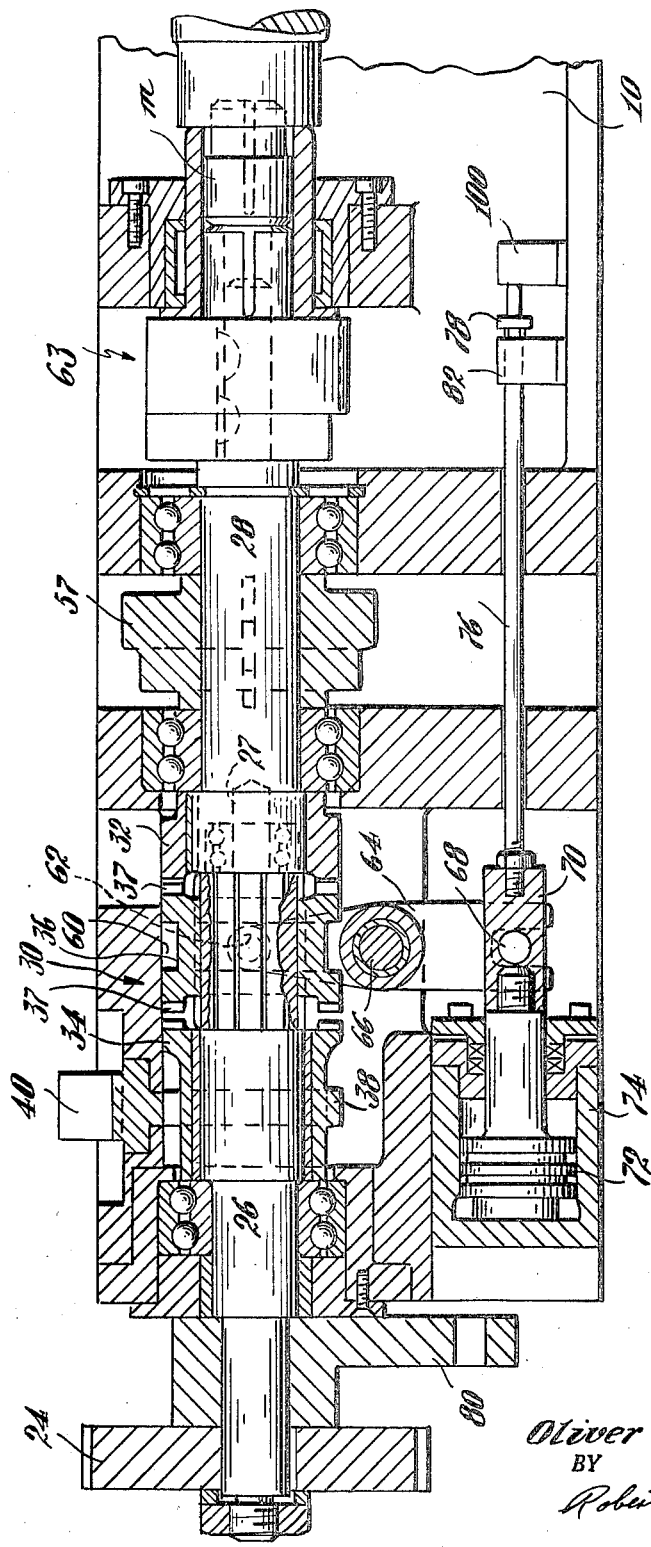

Aug. 9, 1966  O. W. BONNAFE  3,264,903
INDEXING MECHANISM FOR MACHINE TOOLS
Filed March 15, 1961  5 Sheets-Sheet 1
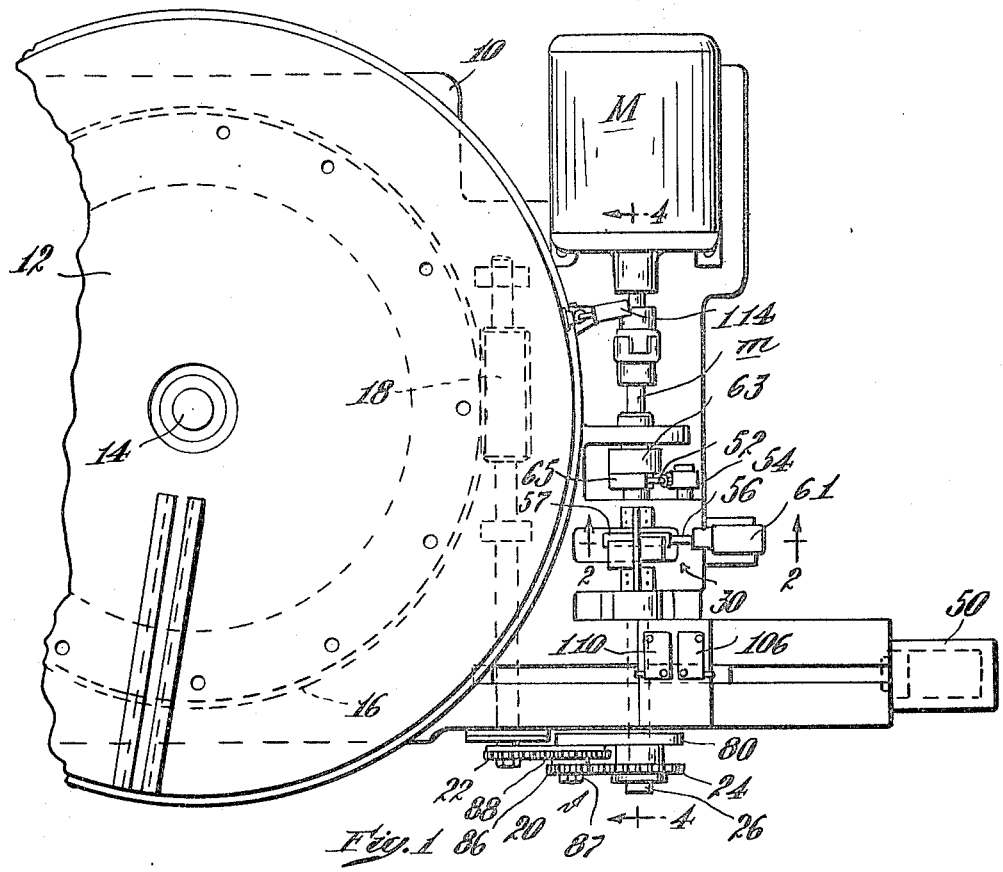
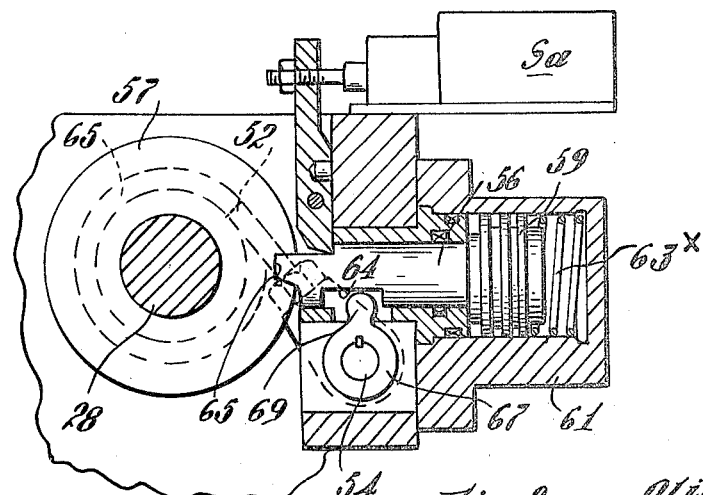
INVENTOR.
Oliver W. Bonnafe
BY
Roberts, Cushman & Grover
ATT'YS

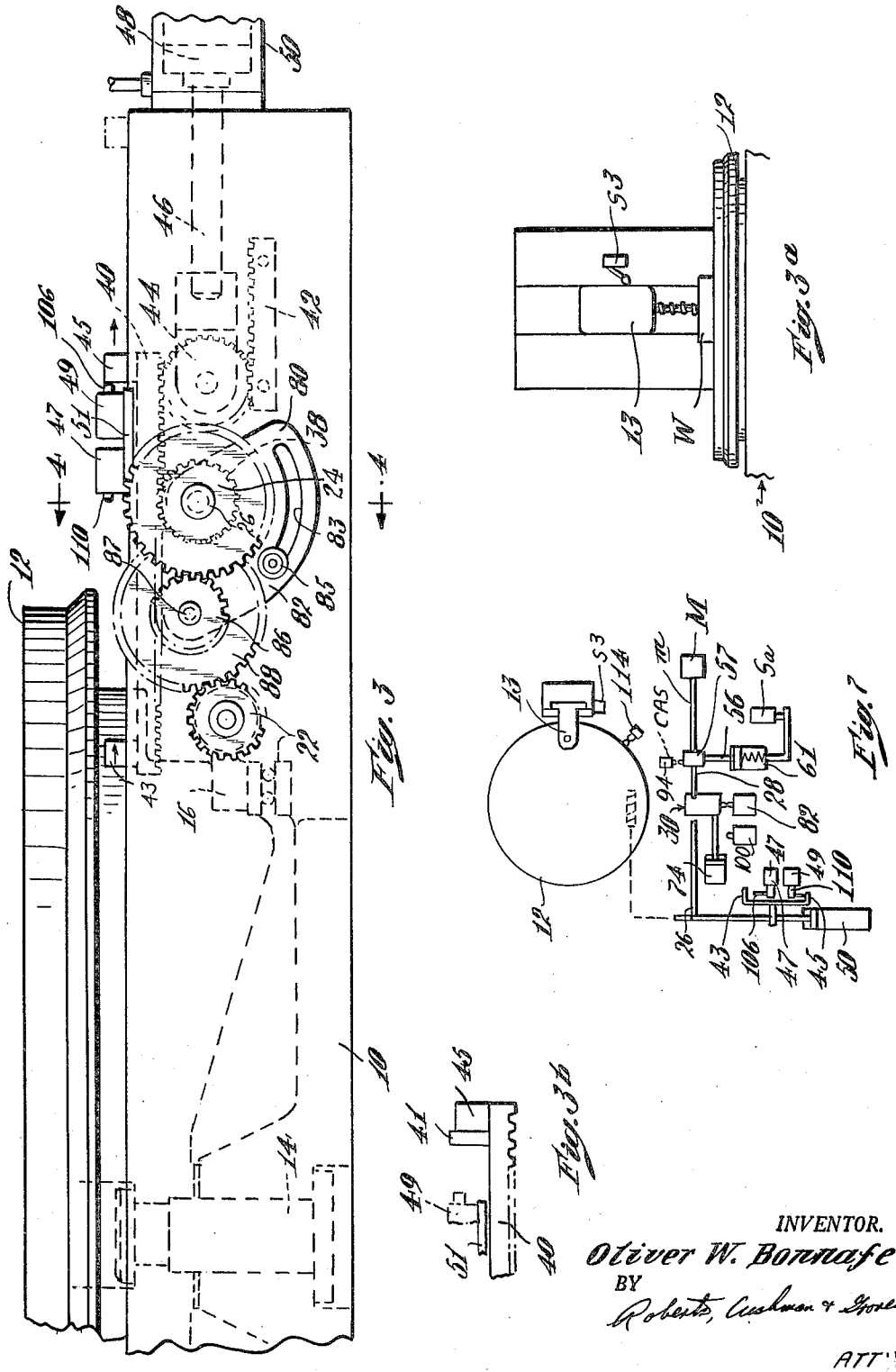

INVENTOR.
Oliver W. Bonnafe
BY
Roberts, Cushman & Grover
ATT'YS

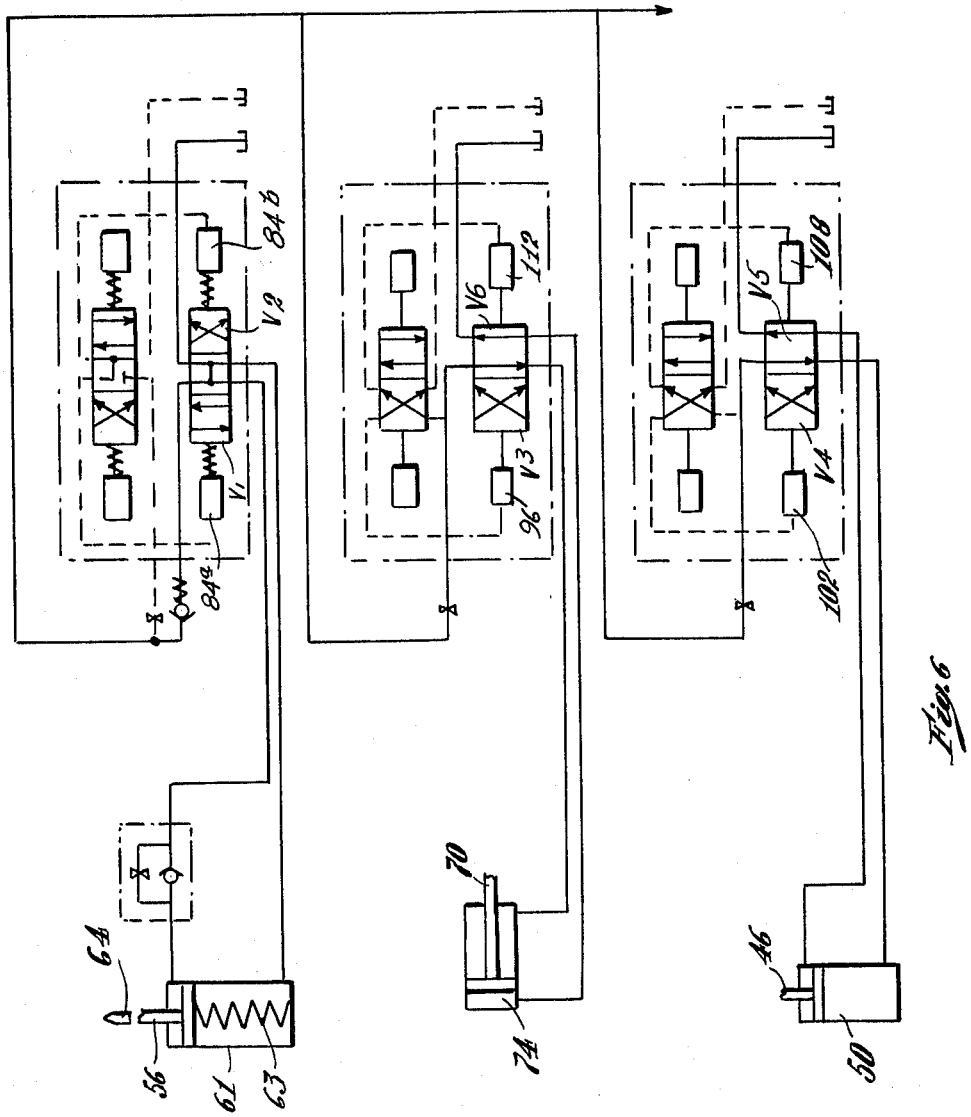

United States Patent Office 3,264,903
Patented August 9, 1966

3,264,903
INDEXING MECHANISM FOR MACHINE TOOLS
Oliver W. Bonnafe, Hudson, Mass., assignor to The Lapointe Machine Tool Company, Hudson, Mass., a corporation of Maine
Filed Mar. 15, 1961, Ser. No. 95,871
21 Claims. (Cl. 74—825)

This invention relates to machine tools and especially to machines of the kind in which there is a table movable relative to a tool such that the tool may be brought into engagement with work on the table at different positions to perform a number of machining operations on the work. Generally there is indexing mechanism associated with the table for automatically moving the table from one position to the next with a high degree of accuracy to insure precision spacing of the machining operation. Sometimes, however, it is desirable to purposely offset the position of one machined portion with respect to the normal spacing of the others, so that the part being manufactured can only be mounted in one specific position with respect to the part with which it is to be assembled. It is accordingly the principal object of this invention to provide a machine tool, such as referred to above, with indexing means operable at a predetermined time in the course of moving the work support equal increments relative to the tool, to change the length of an increment of movement so as to perform the next operation on the work at a different spacing; to provide means for effecting such operation of the indexing automatically; to provide indexing mechanism which is adjustable to permit varying the offset; and to provide indexing mechanism which may be employed with existing machine tools without requiring extensive modification thereof.

As herein illustrated, there is a shaft rotatable to effect indexing movement of the table, means for imparting equal increments of rotation to the shaft, and other means for imparting additional rotation to the shaft at a lesser amount to provide for offsetting one of the machining operations relative to the others. The one means is a motor and the shaft is connected thereto by first and second clutches. During normal indexing the second clutch remains engaged and the first clutch is controlled by a counter which periodically disengages it so as to impart intermittent but equal increments of rotation to the shaft and hence to the table until a predetermined number of increments of movement have been reached. There is also means associated with the clutch for stopping the shaft at precisely the same position each time. At the end of the last indexing operation of the predetermined number, the second clutch is shifted to disconnect the shaft from the motor, connect it to the other means which is a second motor, and initiate operation thereof to turn the shaft the further amount for offset indexing. Following the offset indexing the table is rotated back to the position it had prior to such indexing and the second clutch is returned to its initial position to disconnect the shaft from the second motor and reconnect it to the first motor so as to re-establish normal indexing. The second motor is pressure-operated and the extent of rotation of the shaft thereby is controlled by gauge blocks of predetermined size, adapted to be interposed between a part moved by the motor and a fixed stop. The shaft imparts rotation to the table through a train of gears, including a change gear, so that by substituting one change gear for another, the increment of rotation of the table may be changed. Preferably the gears are so proportioned that the number of teeth on the change gear determines the number of increments of rotation of the index table for any given indexing operation.

Figure 5:
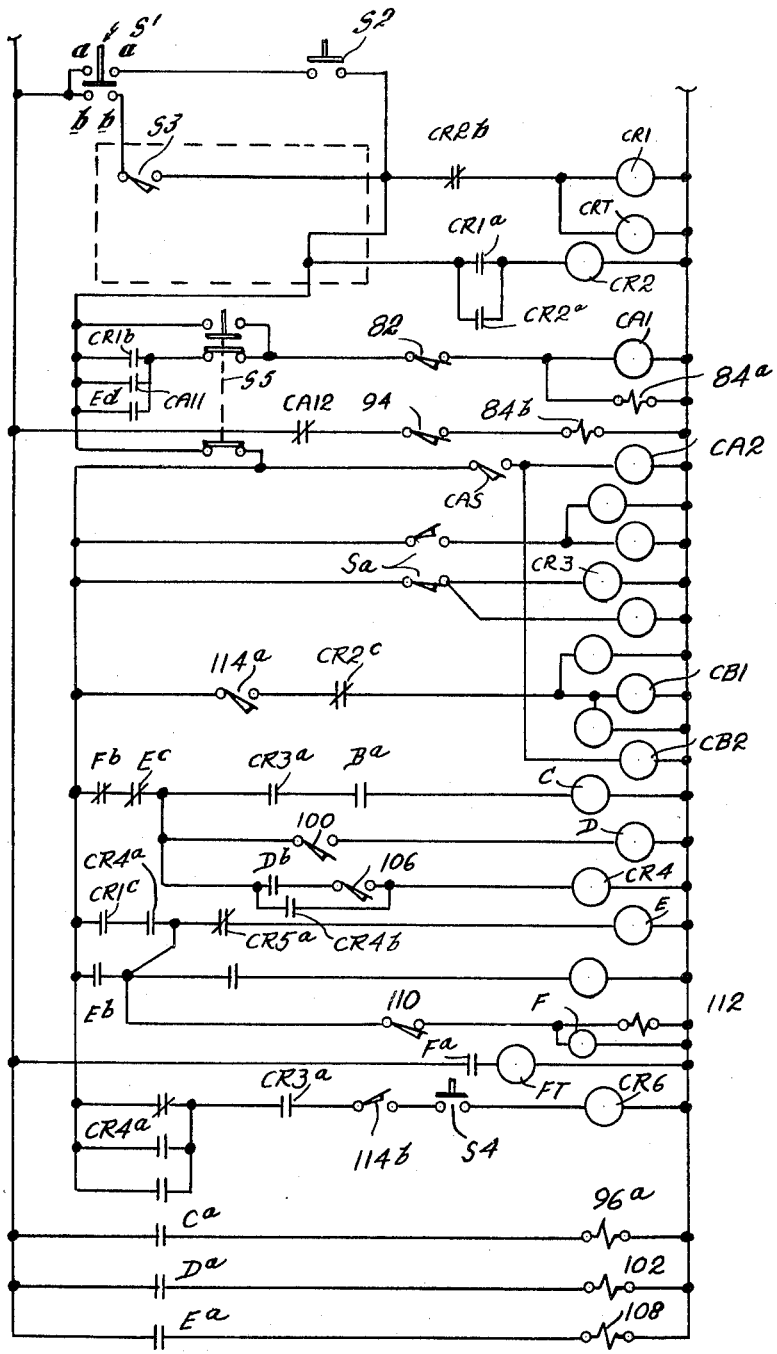

The invention will now be described in greater detail with reference to the accompanying drawings wherein:

FIG. 1 is a plan view of an indexing table for a machine tool, broken away in part;
FIG. 2 is a vertical section taken on the line 2—2 of FIG. 1;
FIG. 3 is a front elevation of FIG. 1;
FIG. 3a is an elevation of a machine tool showing an index table and a vertically movable head supporting the tool for movement relative to a workpiece fixed to the table;
FIG. 3b is a fragmentary elevation showing a gauge block for controlling the length of the offset indexing operation;
FIG. 4 is an enlarged vertical section taken on the lines 4—4 of FIGS. 1 and 3;
FIG. 5 is a diagrammatic layout of the electric control;
FIG. 6 is a diagrammatic layout of the hydraulic control; and
FIG. 7 is a schematic of the mechanism.

Referring to the drawings (FIG. 1), there is a hollow base 10 supporting an index table 12 in a horizontal position for rotation about the vertical axis of a vertically disposed shaft 14 mounted in the base. A head 13 is slidably mounted on the base at one side of the table for movement relative to a workpiece W fastened to the table.

The table 12 has fastened to its underside a ring gear 16 and a worm 18 is journaled in the base in mesh with the ring gear for effecting rotation of the table and hence indexing of the table relative to a tool supported above the table in suitable fashion depending upon its character.

Rotation of the worm 18 is effected by a train of gears 20 (FIGS. 1 and 3). The last gear 22 in the train is fixed to the worm shaft and the first gear 24 in the train is fixed to one end of a shaft 26. The shaft 26 (FIG. 4) is journaled in the base in a horizontal position with its other end in alignment with one end of a short, horizontally disposed shaft 28, the latter also being supported in the base. The opposite end of the shaft 28 is aligned with a shaft $m$ of a motor M. A drive clutch 30 connects the adjacent ends of the shafts 26 and 28 and a one-revolution clutch 63 connects the adjacent ends of the shafts 28 and $m$.

The one-revolution clutch 63, connecting the motor shaft $m$ to the shaft 28, includes a cam 65 (FIG. 2), operable to effect disengagement thereof. The cam 65 is shifted to effect such disengagement by an arm 52 fixed to one end of a stub shaft 54. A collar 67, fixed to the opposite end of the shaft 54, has on it a radial lug 69 which occupies a recess 64 in a piston rod 56 protruding from a cylinder 61, with its outer end lying opposite the peripheral surface of a drum 57 fixed to the shaft 28. The rod 56 is fixed at its inner end to a piston 59 and as long as the piston is held in the right-hand position within the cylinder, so as to hold the arm 52 out of engagement with the clutch cam 65, the motor M will drive the shaft 26 provided, of course, the drive clutch 30 is engaged. There is a spring $63x$ (FIG. 2) between the right-hand end of the cylinder and the piston which urges the piston toward the left; hence, if the pressure is vented from the left end of the cylinder, the spring will force the piston toward the left so as to hold the protruding end of the piston rod engaged with the peripheral surface of the drum. The drum, however, will prevent the piston from moving far enough to the left to engage the arm 52 with the clutch cam and will thus hold it out of engagement with the clutch cam until a notch 65 in the surface of the drum moves into a position opposite the rod, whereupon the rod will be forced into the notch, thereby allowing the arm to move into engagement with the cam to disengage the clutch and thus bring the shaft 28 to a stop. Following disengagement of the clutch 63 pressure is supplied to the right-hand end of the cylinder 61 to hold the piston rod firmly engaged with the notch in the drum. By controlling the venting of pressure from the cylinder 61 the shaft 26 may be caused to rotate any desired number of times before it is brought to a stop. A counter CAS (FIG. 7) which comprises components CA1 and CA2 (FIG. 5) is employed which may set to cause the clutch to be disengaged and re-engaged a predetermined number of times to index the table equal increments. The counter is of the type which counts down from a predetermined setting to zero.

The drive clutch 30, during normal indexing, provides a direct drive between the shaft 28 and the shaft 26 and is comprised of a toothed collar 32 keyed to the shaft 28 and a toothed collar 34 loose on the shaft 26. A collar 36, having teeth 37—37 at both ends, is splined on the shaft 26 between the two collars so that it can be moved from a position in which the teeth 37, at the right end, are engaged with the toothed collar 32 to transmit rotation of the shaft 28 directly to the shaft 26, or to a position in which the teeth 37, at the left end, are engaged with the toothed collar 34 to fix it with respect to the shaft 26 and simultaneously to permit the shaft 26 to be rotated independently of the shaft 28. To effect shifting of the collar 36 the latter is provided with a peripheral groove 60 in which there is situated a pair of rollers 62, mounted on arms 64 fast to a shaft 66 on the frame. One of the arms 64 has a lower end which is forked and embraces a pin 68 fixed to a rod 70 protruding from the piston 72 situated in a cylinder 74. Air under pressure is normally supplied to the right-hand end of the cylinder 74 to hold the piston in the left-hand position and hence to hold the clutch collar 36 engaged with the collar 32. By supplying air pressure to the left-hand end of the cylinder the clutch may be shifted to disconnect the shaft 26 from the shaft 28. A cam rod 76 is fixed at one end to the piston rod 70 and has on its opposite end a switch cam 78, the purpose of which will be described hereinafter.

When the shaft 26 is disengaged from the shaft 28 the shaft 26 may be rotated an additional amount by way of the collar 34 to, in turn, rotate the index table an additional amount, but less than normal indexing, to offset the next machining operation relative to the preceding operation. To effect such rotation of the shaft 26 the toothed collar 34 has on its hub a gear 38 which meshes with a rack bar 40 (FIG. 3), the latter being supported on the base for movement in a horizontal plane relative to the gear 38 and, by such movement, to rotate the gear 38 and hence the shaft 26. To shorten up the stroke required to impart the desired rotation to the gear 38 and hence to the shaft 26, a fixed rack bar 42 is fastened to the frame below the rack bar 40 in spaced parallel relation thereto and a gear 44 is rotatably mounted between the two rack bars on the forward end of the piston rod 46, the rear end of which is fixed to a piston 48 in a cylinder 50. By supplying pressure to the cylinder 50 the gear 44 may be caused to move linearly and, by a combination of linear and rotational movement, to effect movement of the rack bar 40. Linear movement of the rack bar 40 rotates the shaft 26 and hence the first gear 24 of the train of gears. The piston 48 has a constant stroke and hence moves the rack 40 the same distance each time it is operated. In order to vary the amount of added indexing, gauge blocks 41 (FIG. 3b) of predetermined length may be interposed between one of a pair of stops 43, 45 (FIG. 3) carried by the rack bar 40 which limits movement of the rack bar by engagement with one end of a fixed stop 51 fixed to the frame.

The worm 18 (FIG. 1) is designed so that for one turn the table turns one one-hundred and eightieth ($\frac{1}{180}$) of a revolution. Hence, each time the gear 22 at the end of the worm shaft is rotated once, the table will turn one one-hundred and eightieth ($\frac{1}{180}$) of a revolution. The gear 22 is removably attached to the worm shaft so that it may be removed and replaced by a gear of different size and is accordingly known as a "change gear."

The gear train comprises, in addition to the gears 22 and 24, intermediate gears 86 and 88, the gear 86 meshing with the gear 24 and the gear 88 meshing with the gear 22. By choosing the proper ratios of these gears, the train may be proportioned so that the number of teeth on the change gear will determine the number of one one-hundred and eightieth ($\frac{1}{180}$) of a revolution the table will make for one revolution of the drive gear 22. To attain this relation the ratios of the gears 24, 86 and 88 must be such that for each one revolution of the shaft 26, the gear 88 turns a number of teeth corresponding to the number of teeth on the ring gear 16. By way of example only, and without limitation, if a two-to-one ratio is provided between the gears 24 and 86, and the gear 88 has 90 teeth for each turn of the shaft 26, the gear 88 will be turned 180 teeth. Accordingly, if the change gear 88 has 30 teeth, it will be turned six times. Turning the change gear six times will rotate the worm 18 six times and since the latter has a single thread, six turns of the worm will rotate the table six one-hundred and eightieths ($\frac{6}{180}$) or $\frac{1}{30}$ of a revolution. It is, of course, within the scope of the invention to use a greater or lesser number of teeth on the ring gear and to maintain the same relationship by employing a suitable ratio of gears.

The machine is operated automatically with a timer control so that a series of equal indexing operations takes place followed by an offset indexing operation, whereupon the machine is restored to its initial condition for normal indexing.

Briefly, normal operation takes place as follows: With the drive clutch 30 shifted to a position in which the shaft 28 is connected to the shaft 26, each indexing operation takes place as a result of rotation of the shaft 28 one or more times, the latter being driven by the motor M and being stopped at the end of each indexing operation by the one-revolution clutch 63. Following each indexing operation the workpiece is operated upon, and after the tool has been withdrawn from the work, the one-revolution clutch 63 is re-engaged to drive the shaft 28 again for the next indexing operation. Indexing at equal intervals proceeds in this fashion until the counter mechanism operates at the end of a normal indexing operation, that is, when the shaft 28 has been brought to a stop after a predetermined number of indexing operations to supply fluid pressure to the left-hand end of the cylinder 74, so as to shift the drive clutch 30 to a position to disengage the shaft 26 from the shaft 28 and to engage the collar 34 with the shaft 26. Shifting of the drive clutch 30 also operates to supply pressure to the right end of the cylinder 50 which, in turn, by advancing the gear 44 effects rotation of the train of gears 20 an additional amount so as to turn the index table an additional amount for the offsetting operation. Following the offsetting operation the withdrawal of the tool from the work closes a switch S3 which supplies pressure to the left end of the cylinder 50 to rotate the table back to the position it had prior to the added rotation and, at the same time, to rotate the shaft 26 back to its original position relative to the shaft 28, so that normal indexing operations may be resumed.

The electric and hydraulic controls for the machine are shown in FIGS. 5 and 6 and a schematic of the switches in relation to the mechanical components of the machine in FIG. 7.

The indexing mechanism may be operated manually or automatically. When it is manually operated the switch S1 is moved to a position to engage contacts a—a. When it is to be operated automatically the switch S1 is moved to a position to engage the contacts b—b. In the manual position the machine is indexed for each machining operation by depression of an indexing switch S2. In the automatic position the machine is indexed each time the tool of the machine tool with which it is used is retracted from the work, for example closing the switch S3 located adjacent the head.

Prior to commencing a machining operation a counter (CA) (not shown) is set for the number of equally spaced machining operations which are to be made. The counter (CA) is of the ratchet type and includes two coils $CA^1$ and $CA^2$ (FIG. 5). Coil $CA^1$ actuates a clutch to engage a ratchet with the ratchet wheel and coil $CA^2$ to rotate the ratchet wheel. The counter (CA) counts the rotation for normal indexing. With the counter (CA) set for a predetermined number of operations, depression of the index switch S2, or automatic closing of the switch S3 will energize relay $CR^1$, which is held momentarily by a timed relay CRT. This closes contacts $CR1a$, $CR1b$ and $CR1c$. Closing contact $CR1a$ energizes relay CR2 which promptly closes contacts $CR2a$. Relay $CR^1$ then drop out but not before a momentary pulse is sent through contact $CR1b$ to the coil $CA^1$. Coil $CA^1$ locks itself in by closing contact $CA^{11}$. Switch 82 is held closed as long as the clutch 30 occupies the right-hand position wherein the shafts 26 and 28 are connected, so that coil $84a$ is energized. Energization of coil $84a$ operates a valve V1 (FIG. 6), so as to supply pressure to the cylinder 61 in a direction to retract the lock bolt 64 from the drum 57. Contact $CA^{12}$ is open as is also clutch switch 94, so that the coil $84b$ is not energized until the clutch switch 94 is closed by engagement of a cam on the drum with it. A counter switch CAS is closed and opened each time the shaft is rotated by the same cam that operates the clutch switch 94, just after the latter disengages the switch 94 and this pulses the relay $CA^2$, thus retracting the setting toward zero. When the zero setting is reached contact $CA^{11}$ is opened which de-energizes relay $CA^1$ which, in turn, de-energizes coil $84a$, so that pressure is vented from the top of the cylinder 61 (FIG. 6) and the spring 63 now holds the lock bolt 56 against the surface of the drum until the drum rotates through one-revolution, whereupon the lock bolt drops into the notch and switch 94 is simultaneously closed. De-energization of relay $CA^2$ also allows contact $CA^{12}$ to close and hence to energize coil $84b$ which operates valve V2 (FIG. 6), to supply pressure to the cylinder 61 in a direction to press the lock bolt 56 in the notch in the drum 57. A safety switch Sa prevents further operation if the bolt 56 is not properly seated in the notch. The counter switch CAS also sends an impulse to the impulse coil $CB^2$ of a second counter CB having a clutch coil $CB^1$. Clutch coil $CB^1$ is energized through contact $CR2c$ which is closed when relay $CR^2$ is energized. Hence, energization of coil $CB^2$ closes contact $Ba$ through contact $CR3a$. When the lock bolt 56 moved into locking position relay $CR^3$ was energized through switch Sa thereby closing contact $CR3a$. Closing contact $CR3a$ energizes relay C. Energization of relay C closes contact $Ca$ which, in turn, energizes coil 96 so as to shift the valve V3 (FIG. 6) to a position such that pressure is supplied to the cylinder 74 in a direction to shift the drive clutch 30 from right to left and thereby to disconnect the shaft 28 from shaft 26. Shifting the clutch to the left closes a cylinder index switch 100 by way of the switch cam 78 which, in turn, energizes relay D. Energizing relay D closes contact $Da$ which energizes coil 102 to shift the valve V4 in a direction to supply pressure to the cylinder 50 so as to advance the piston therein and index the table forwardly an added amount. Contact $Db$ was also closed. Hence, at the moment the indexing movement of the piston in the cylinder 50 is completed, the block 45 closes a switch 106 so that current is supplied to relay CR4, energizing it. Relay CR4 closes contact $CR4b$ to hold itself in and also closes contact $CR4a$. Contacts $CR4a$ supplies current through closed contact $CR3a$, energizing relay CR6. Energizing relay CR6 closes a switch relay or switch on the machine tool (not shown) which initiates a cycle of operation. Relay CR6 is time-delayed and de-energizes after operation of the machine has been initiated. At the end of the machining operation retraction of the tool from the work closes switch S3 thereby again energizing relay CR1. This closes contact $CR1c$ and since the contact $CR5a$ is closed relay E is energized. Relay E latches itself closed through contact $Eb$. Contact $Ea$ is also closed which energizes coil 108, thereby shifting the valve V5 to supply pressure to the cylinder 50 to retract the indexing mechanism by the amount it advanced the table so as to move the table back to the position it had prior to the added indexing. When the piston makes its return stroke the block 43 contacts a switch 110, closing it. Closing switch 110 energizes coil 112 thereby shifting valve V6 to a position to supply pressure to the cylinder 74 to move the drive clutch 30 from left to right, to reconnect the shaft 26 to the shaft 28. Since the contacts $Eb$ and $Ed$ are closed, current is supplied through switches 82 to the relay $CA^1$ and to coil $84a$ to retract the lock bolt 56 by shifting the valve V1 to supply pressure to the cylinder 63. While the coil 102 is energized latch relay F is engaged so as to close contact $Fa$ and open $Fb$. Opening contact $Fb$ de-energizes relays C, D and CR4.

Switch 114 has two contacts $114a$ and $114b$. The contact $114a$ is opened when the table starts to rotate by disengagement of the cam on the table and simultaneously the contact $114b$ is closed. Switch S4 is manually closed to provide for single or continuous indexing. There is also a manually shiftable switch S5 for effecting rotation of the table independently of the indexing mechanism.

It should be understood that the present disclosure is for the purpose of illustration only and that this invention includes all modifications and equivalents which fall within the scope of the appended claims.

I claim:

1. In combination with a machine tool, means supporting a work-supporting table and a tool for relative movement to perform an operation on a work piece supported by the table; indexing means for automatically effecting relative movement of said work-supporting table and said tool in equal increments between successive operations, means operating, following a predetermined one of a number of indexing operations, to index the table a further amount, means operating, at a predetermined time, following the further movement of the table to restore it to the position it occupied prior to said additional movement, and means operating, by restoration of the table to said original position, to reinstate operation of the indexing means for effecting movement of the table equal increments.

2. In combination with a machine tool in which there is a work-supporting table and a tool mounted at a predetermined position for movement to and from the table, of means for effecting movement of the table relative to the tool to bring successive portions of work on the table to a position opposite the tool, said means comprising a shaft, means including a clutch for effecting intermittent rotation of the shaft through equal angular distances, means rendering the clutch inoperative following a predetermined number of intermittent rotations of the shaft, a motor connectable to the shaft to effect rotation thereof, independently of the first means, said clutch operating, when moved to said position, to connect the motor to the shaft, and means operative by movement of the clutch to said second position to initiate operation of the motor.

3. In combination with a machine tool in which there is a work-supporting table and a tool mounted at a predetermined position for movement to and from the table, of means for effecting movement of the table relative to the tool to bring successive portions of work on the table to a position opposite the tool, said means comprising a shaft, means including a clutch for effecting intermittent rotation of the shaft equal angular distances, means operative to stop rotation of the shaft following a predetermined number of intermittent rotations at a predetermined position and for simultaneously shifting the clutch to disconnect the shaft from said first means, a motor connectable to the shaft to effect rotation thereof, means operative, by shifting of the clutch, to connect the motor thereto, means operating, by shifting of the clutch, to initiate operation of the motor, and means for limiting rotation of the shaft through an angular distance less than that imparted to it by the first means.

4. In combination with a machine tool in which there is a work-supporting table and a tool mounted at a predetermined position for movement to and from the table, of means for effecting movement of the table relative to the tool to bring successive portions of work on the table to a position opposite the tool, said means comprising a shaft, means including a clutch having first and second positions, said clutch, in the first position, operating to effect periodic rotation of the shaft through equal angular distances, means operating to stop the shaft at precisely the same position at the end of each period of rotation, and means simultaneously shifting the clutch to said second position to disconnect the shaft from said first means, a motor connectable to the shaft to effect rotation thereof, and means operative, by the movement of the clutch to said second position, to connect the motor to the shaft and to initiate operation thereof to rotate the shaft an additional amount.

5. In combination with a machine tool in which there is a work-supporting table and a tool mounted at a predetermined position for movement to and from the table, of means for effecting movement of the table relative to the tool to bring successive portions of work on the table to a position opposite the tool, said means comprising a shaft, driving means including a clutch having first and second positions, said driving means operating to effect periodic rotation of the shaft when the clutch is in said first position, means operating to bring the driving means to a stop at precisely the same position at the end of each periodic rotation, said means operating to shift the clutch to said second position to disconnect the shaft from said first means, a motor, means movable by the clutch to said second position to connect the motor to the shaft, and to initiate operation of the motor to rotate the shaft a further amount, and means for limiting the further rotation of the shaft a predetermined amount.

6. In combination with a machine tool in which there is a work-supporting table and a tool mounted at a predetermined position for movement to and from the table, of means for effecting movement of the table relative to the tool to bring successive portions of work on the table to a position opposite the tool, said means comprising a first shaft, driving means including a second shaft and a clutch having first and second positions, said clutch in said first position drivably connecting the first and second shafts, means for periodically rotating the second shaft a predetermined angular distance, and stopping it at precisely the same position following each period of rotation, means operating, when the second shaft is brought to a stop, to shift the clutch to said second position, a motor, means operating by movement of the clutch to said second position to connect the motor to the first shaft and to initiate operation of the motor to turn the first shaft an additional amount, and means limiting the additional rotation of the first shaft a predetermined amount.

7. In combination with a machine tool in which there is a work-supporting table and a tool mounted at a predetermined position for movement to and from the table, first and second shafts, a first clutch having first and second positions, said first clutch drivably connecting the second shaft in said first position and disconnecting the shaft in said second position, means for driving the second shaft including a motor and a clutch, said second clutch having first and second positions, said second clutch, in said first position, connecting the motor to the second shaft and, in the second position, disconnecting the motor from said shaft, means for periodically engaging and disengaging the second clutch for rotating the shaft through equal angles, means operable, each time the second clutch is disengaged, to bring the second shaft to a stop at precisely the same position, and to shift the first clutch to said second position, a motor connected to said second shaft, means operable, by movement of said clutch to said second position, to connect the motor to said shaft and to initiate operation thereof to turn the second shaft a predetermined additional amount, means for limiting the additional amount of rotation of said shaft, and means operable, when the shaft reaches said predetermined additional rotation, to reverse the motor to turn the shaft back to the position it had relative to the first shaft before it was advanced said additional amount.

8. In combination with a machine tool in which there is a work-supporting table and a tool mounted at a predetermined position for movement to and from the table, a shaft supporting the table for rotation relative to the tool, and means for effecting rotation of the shaft comprising a drive shaft, first and second motors, a clutch means operating in one position to connect the drive shaft to the first motor and in the other position to connect it to the second motor, mean imparting periodic rotation to the drive shaft through equal angles when the clutch means is in said one position, means operating, following a predetermined number of periodic rotations of the drive shaft, to shift the clutch means to said second position to connect the second motor thereto, and means operating, by movement of the clutch means to said second position, to effect operation of said second motor to impart additional rotation to the drive shaft.

9. In combination with a machine tool in which there is a work-supporting table and a tool mounted at a predetermined position for movement to and from the table, of indexing means including first and second shafts, a first clutch interposed between the adjacent ends of the shafts movable, in one direction, to provide a driving connection between the shafts and, in the other, to disconnect the shafts, a motor, a one-revolution clutch interposed between the second shaft and the motor operable, in one position, to provide a drive for the motor to said second shaft and, in the other position, to disconnect the drive, a second motor connectable to the first shaft by movement of the first clutch to said second position, means for engaging and disengaging said one-revolution clutch a predetermined number of times, means operable, following engagement of said one-revolution clutch said predetermined number of times, to disengage it and simultaneously to shift the first clutch to said second position, and means operable, by movement of the first clutch to said second position, to initiate operation of said second motor to impart additional movement to the first shaft following the last of the indexing movements imparted thereto by the second shaft.

10. Index apparatus for machine tools, comprising an index table, aligned shafts having adjacent ends, a motor connected to one shaft, means connecting the other shaft to the table, clutch means connecting the adjacent ends of the shafts, said clutch means operating in one position, to transmit rotation of the motor driven shaft to the other shaft and, in the other position, to permit rotation of the other shaft independently of the motor driven shaft, means for stopping rotation of the motor driven shaft at a predetermined position, means for shifting the clutch to said second position to permit rotation of said other shaft independently of the motor driven shaft to advance the table a predetermined further amount, and means automatically operable, when the clutch is shifted to said second position, to effect rotation of said other shaft.

11. Index apparatus for machine tools, comprising an index table, aligned shafts having adjacent ends, a motor connected to one end of one shaft, gearing connecting an end of the other shaft to the table for effecting rotation thereof, a two-position clutch at the adjacent ends of the shaft operable, in one position, to transmit rotation of the one shaft directly to the other and hence to effect rotation of the table and, in the other position, to permit the other shaft to be rotated independently of the one shaft, means for controlling rotation of the motor driven shaft, said means being operable to step the table around a predetermined number of equal increments, and means associated with the other shaft, when the clutch is in the second position, to effect rotation of the table independently of the motor driven shaft to rotate the table beyond the last increment of rotation imparted thereto by said motor driven shaft.

12. Index apparatus for machine tools, comprising an index table rotatable in a horizontal plane relative to the tool, a ring gear on the table and worm meshing therewith for effecting rotation of the table, aligned shafts having adjacent ends, a motor, a clutch connecting the motor to an end of one of the shafts, a gear train connecting an end of the other shaft to the worm, a drive clutch at the adjacent ends of the shaft operable, in one position, to transmit rotation of the motor driven shaft directly to the other shaft so as to rotate the table and, in the other position, to permit the other shaft to rotate independently of the motor driven shaft, a device operable to engage and disengage the clutch at predetermined intervals to effect rotation of the table equal increments relative to the tool, and means operable, when the drive clutch occupies the second position, to rotate the other shaft independently of the motor driven shaft to move the table a different amount relative to the tool.

13. Index apparatus for machine tools, comprising an index table rotatable in a horizontal plane relative to a tool, a ring gear on the table and worm meshing therewith for effecting rotation of the table, aligned shafts, a motor, a clutch connecting the motor to an end of one shaft, a gear train connecting an end of the other shaft to the worm, a drive clutch including axially spaced collars, one of which is fixed to the one shaft and the other loose on the other shaft, and an intermediate collar splined on the other shaft and movable thereon into engagement with either one of the collars to effect, in one position, transmission of motion from the one shaft directly to the other and, in the other position, to release the other shaft from the one shaft to permit rotation thereof independently of the one shaft, means for engaging and disengaging the first clutch at regular intervals to effect equal displacement of the one shaft, means operable at the end of a predetermined number of equal indexing operations to disengage the first clutch and shift the drive clutch to said second position, a gear ring on the periphery of the collar on the other shaft, a rack meshing therewith, and means operable to effect movement of the rack a predetermined distance to rotate the other shaft independently of the motor driven shaft and hence to change the position of the table relative to the tool, operation of said last-named means being initiated by movement of the drive clutch to said second position.

14. Index apparatus for machine tools, comprising an index table rotatable in a horizontal plane relative to a tool, a ring gear on the table and worm meshing therewith for effecting rotation of the table, aligned shafts, a rotor, a first clutch connecting the motor to an end of one shaft, a gear train connecting an end of the other shaft to the worm, a second clutch including axially spaced collars, one of which is fixed to the one shaft and the other of which is loose on the other shaft, and an intermediate collar splined on the other shaft and movable thereon into engagement with either one of the collars to effect, in one position, transmission of motion from the one shaft directly to the other and, in the other position, to release the other shaft from the one shaft to permit rotation thereof independently of the one shaft and to fix the loose collar on the other shaft, means for engaging and disengaging the first clutch at regular intervals to effect indexing of the table equal amounts, means operable, at the end of a predetermined number of equal indexing operations, to disengage the first clutch and shift the second clutch to said second position, a ring gear on the periphery of the collar on the other shaft, a rack meshing therewith, and means for effecting movement of the rack to advance the table a predetermined amount, said last-named means being initiated by movement of the second clutch to said second position.

15. In combination with a machine tool, a work-supporting table and tool holder supported for relative movement to perform an operation on a work piece supported by the table; automatically operative means comprising index means operative to step the table a predetermined number of equal distances relative to the tool, means automatically operative at the conclusion of said predetermined number of steps to render the said index means inoperative and to step the table a different distance, and means automatically operative to restore the control of the indexing to the said indexing means following operation of said second means.

16. The combination according to claim 15, wherein the second means is operative to step the table a lesser distance than the indexing means.

17. The combination according to claim 15, wherein the second means is operative to step the table a greater distance than the indexing means.

18. In combination with a machine tool, a work-supporting table and tool holder supported for relative movement to perform an operation on a work piece supported by the table; automatically operative means comprising index means operative to step the table a predetermined number of equal distances relative to the tool, means operative at the conclusion of said predetermined number of steps to render the said index means inoperative and to step the table a different distance, and means operative to return the table to the position it occupied at the termination of the predetermined number of steps of equal distance and to restore the control of the indexing to the said indexing means.

19. Apparatus according to claim 2, wherein the motor is operably connected to effect rotation of the shaft by means of spaced parallel racks, one of which is fixed and the other of which is immovable, a gear fast to the shaft and in mesh with the movable rack, a gear in mesh with both of the racks, and a piston rod to which the latter gear is mounted operably connected to the motor and movable linearly thereby parallel to the racks.

20. Index apparatus comprising an index member, first and second motors, a clutch means shiftable from a position drivably connecting the first motor to the index member to a position drivably connecting the second motor to the index member, means operable while the first motor is connected by said clutch means to the index member to effect indexing movement thereof through predetermined distances, means operable when the second motor is connected to the index member by said clutch means to effect indexing movement of the index member a different distance, and means operable at the end of a predetermined number of indexing movements of the index member while connected to said first motor automatically to shift the clutch means and initiate operation of said second motor to index the member said different distance.

21. Index apparatus comprising an index member, first and second motors, a clutch means shiftable from a position drivably connecting the first motor to the index member to a position drivably connecting the second motor to the index member, means operable while the first motor is connected by said clutch means to the index member to effect indexing movement thereof through predetermined distances, means operable when the second motor is connected to the index member by said clutch means to effect indexing movement of the index member a different distance, means operable at the end of a predetermined number of indexing movements of the index member while connected to said first motor automatically to shift the clutch means in a direction to disconnect the index member from the first motor at the end of any indexing movement of the index member, means automatically operable by shifting of the clutch means to initiate operation of the second motor, and means operable following indexing of the index member by said second motor to restore the index member to the position occupied prior to such indexing by said second motor.

References Cited by the Examiner

UNITED STATES PATENTS

| | | | |
|---|---|---|---|
| 363,776 | 5/1887 | Sweet | 74—325 |
| 1,165,718 | 12/1915 | Schultz | 74—110 X |
| 1,295,363 | 2/1919 | Parker | 74—825 |
| 2,628,413 | 2/1953 | Hallenbeck | 74—821 X |
| 2,629,163 | 2/1953 | Makant et al. | 74—822 X |
| 2,766,630 | 10/1956 | Ehrler | 74—110 |
| 2,876,661 | 3/1959 | Jaeger | 74—821 |
| 2,916,950 | 12/1959 | Bullard | 74—815 X |
| 2,956,454 | 10/1960 | Hansen | 74—822 X |
| 2,959,074 | 11/1960 | Hallahan | 74—821 |
| 2,979,972 | 4/1961 | Danly | 74—821 |
| 2,989,878 | 6/1961 | Denkowski | 74—625 |
| 3,004,525 | 10/1961 | Emain | 74—817 X |
| 3,085,452 | 4/1963 | Thompson | 74—822 |

FOREIGN PATENTS 18,055   8/1908   Great Britain.

MILTON KAUFMAN, *Primary Examiner.*

DON A. WAITE, BROUGHTON G. DURHAM,
*Examiners.*

D. P. ROONEY, D. H. THIEL, *Assistant Examiners.*